(No Model.) 2 Sheets—Sheet 1.
L. BARNES, Sr. & C. O. BARNES.
BICYCLE HANDLE BAR AND HANDLE BAR STEM ATTACHMENT.
No. 568,082. Patented Sept. 22, 1896.
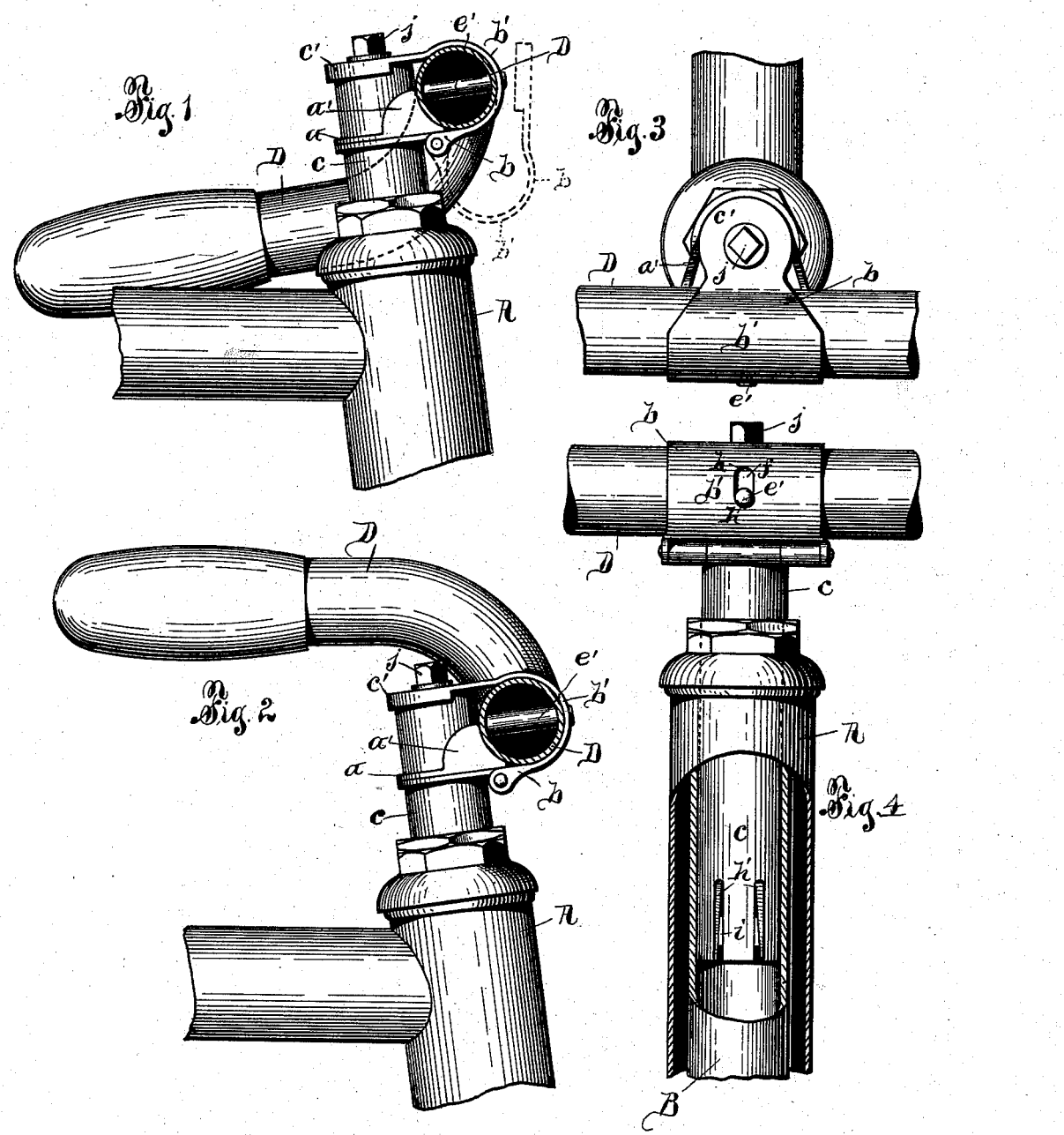
WITNESSES:
INVENTORS
ATTORNEY (No Model.) 2 Sheets—Sheet 2.
L. BARNES, Sr. & C. O. BARNES.
BICYCLE HANDLE BAR AND HANDLE BAR STEM ATTACHMENT.
No. 568,082. Patented Sept. 22, 1896.
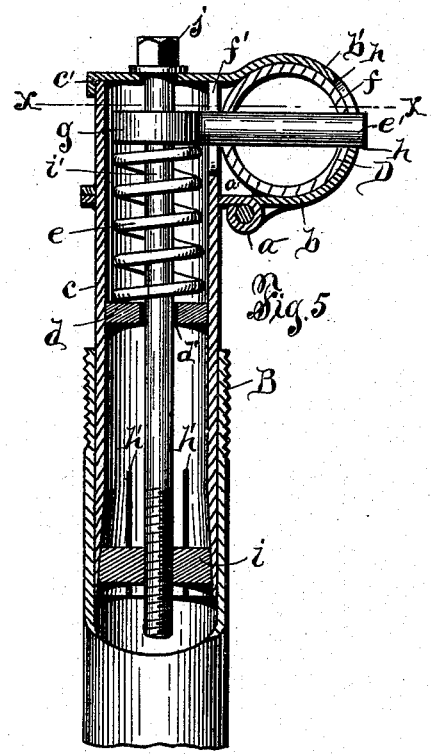
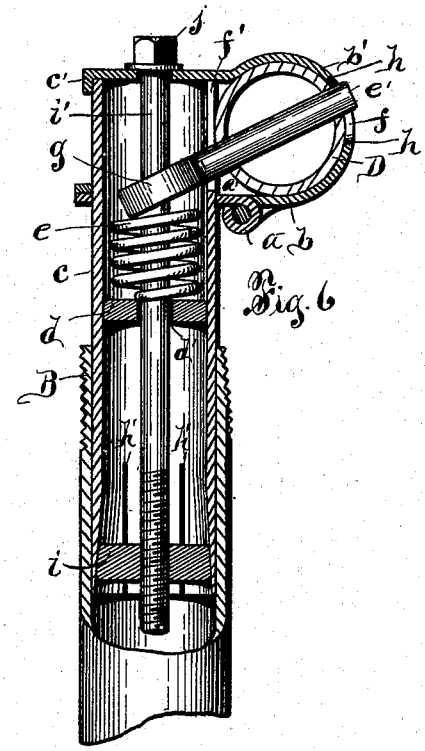
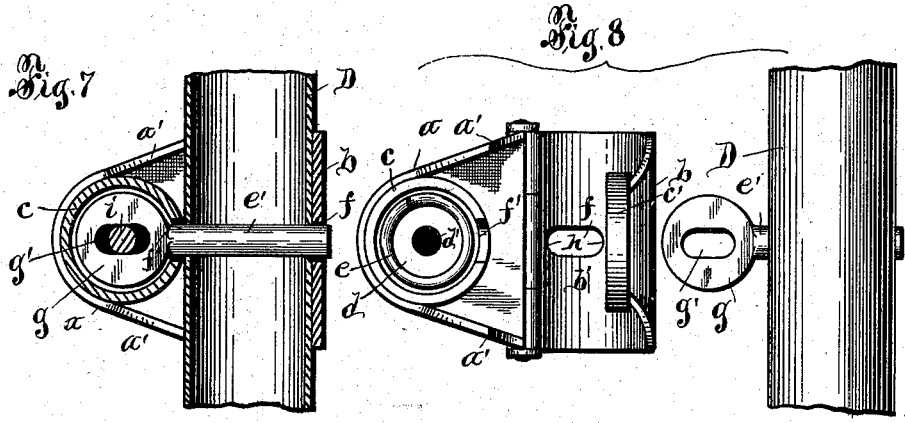
WITNESSES:
O. E. Tomlinson.
J. J. Laass
INVENTORS
Lucien Barnes, Sr.
Charles O. Barnes
By E. Laass
their ATTORNEY

UNITED STATES PATENT OFFICE.

LUCIEN BARNES, SR., AND CHARLES O. BARNES, OF SYRACUSE, NEW YORK.

BICYCLE HANDLE-BAR AND HANDLE-BAR-STEM ATTACHMENT.

SPECIFICATION forming part of Letters Patent No. 568,082, dated September 22, 1896.

Application filed February 14, 1896. Serial No. 579,220. (No model.)

*To all whom it may concern:*

Be it known that we, LUCIEN BARNES, Sr., and CHARLES O. BARNES, of Syracuse, in the county of Onondaga, in the State of New York, have invented new and useful Improvements in Bicycle Handle-Bars and Handle-Bar-Stem Attachments, of which the following, taken in connection with the accompanying drawings, is a full, clear, and exact description.

This invention relates to improvements in bicycles, and has special reference to the attachment of the handle-bar to its stem and the attachment of said stem to the steering-fork stem.

The main object of the invention is to provide an attachment for the handle-bar, whereby said bar will yield to pressure exerted thereon by the rider of the bicycle, and thus overcome the jar produced on the bar while the bicycle is in motion, and also to provide a simple and efficient attachment, whereby the handle-bar can be readily removed to reverse the same, thus forming the so-called "combined upturned and drop handle-bar;" and, furthermore, the object is to provide a handle-bar stem with simple and efficient fastening devices, whereby the same can be readily adjusted longitudinally to raise and lower the handle-bar for the convenience of the rider; and to that end the invention consists, essentially, in the combination of a suitably-journaled steering-fork stem, a handle-bar stem secured longitudinally adjustably in said fork-stem, a removable and reversible handle-bar suitably journaled on its stem, whereby the same will yield to downward pressure exerted thereon by the rider of the bicycle, a cushioning device for the bar, and means to move said bar to its normal position; and the invention consists, furthermore, in the novel details of construction, as hereinafter more fully described, and specifically set forth in the claims.

In the annexed drawings, Figure 1 is a side view of the upper portion of the head of the bicycle, illustrating our improved handle-bar attachment, said bar being shown in cross-section and in its dropped position. Fig. 2 is a similar view showing said bar in its reversed position or turned up. Fig. 3 is a plan view of the same, showing only the central portion of the handle-bar. Fig. 4 is a front view with the head and steering-fork stem shown partly in section to illustrate the means of securing the handle-bar stem adjustably in said fork-stem. Fig. 5 is a longitudinal section of the upper end portion of the steering-fork stem and handle-bar stem, showing the handle-bar in its normal position. Fig. 6 is a similar view showing said bar in its yielded position. Fig. 7 is a horizontal transverse section on line X X in Fig. 5, and Fig. 8 is a plan view showing the handle-bar removed.

Similar letters of reference indicate corresponding parts.

A represents the so-called "head" of the bicycle, in which is journaled the steering-fork stem B by means of the well-known ball-bearings, (not necessary to be shown,) and in said fork-stem is located the handle-bar stem $c$. On said handle-bar stem is brazed or otherwise securely fastened thereto a support $a$, formed with two flanges $a'$ $a'$, and hinged to said support is a clamp $b$, formed with a cylindrical portion $b'$, in which is journaled the handle-bar D, which bar is held firmly against the flanges $a'$ $a'$, said flanges having their front edges formed segmental shape to conform to the handle-bar. The clamp has its free end portion formed annular, as shown at $c'$, which serves as a cap over the upper end of the handle-bar stem $c$. Within the stem $c$ is securely brazed or otherwise fastened thereto a disk $d$, provided with an eye $d'$, and upon said disk rests a spiral spring $e$. Passing transversely through the handle-bar D is a pin $e'$, having its outer end movable in the slot $f$ of the clamp $b$. The opposite or inner end portion of said pin moves in the slot $f'$, formed in the upper end portion of the handle-bar stem $c$, and the inner end of the pin is formed with a head $g$, by which it bears on the spring $e$, which spring serves as a cushion for said bar when it is pressed down and also to move the same to its normal position, and in the said head is formed an elongated eye $g'$. The upper and lower ends of the slot $f$ in the clamp $b$ form stops $h$ $h$ for the outer end of the pin $e'$, thereby limiting the downward and upward movement of the handle-bar D, and by said pin passing through the aforesaid slots the handle-bar is prevented from shifting longitudinally in the aforesaid clamp.

The lower end portion of the handle-bar stem $c$ is formed tapering internally toward its end and is provided thereat with longitudinal slits $h'$ $h'$, and within the said tapered portion of the stem is located a nut $i$, tapered externally. Extending longitudinally through the stem $c$ is a bolt $i'$, which passes freely through the elongated eye $g'$ in the pin $e'$ and the eye $b'$ in the disk $d$, and engages the tapered nut $i$. Said bolt is formed on its upper end with a head $j$, by which it bears on the outer face of the cap $c'$ over the end of the handle-bar stem $c$. By turning said bolt and drawing up the nut $i$ the lower end of said stem is expanded and thereby secures a firm hold on the steering-fork stem B, and holds the aforesaid stem in its longitudinally-adjusted position. By said bolt bearing on the cap $c'$, as aforesaid, the clamp $b$ is made to firmly hold the handle-bar D.

When it is desired to reverse the handle-bar from the position shown in Fig. 1 of the drawings to the position shown in Fig. 2, or vice versa, the bolt $i'$ is removed and the clamp $b$ thus allowed to be swung down, as indicated by dotted lines in Fig. 1, whereby the handle-bar can be lifted out of the same. After the bar is replaced the clamp is swung back with its cap over the end of the stem $c$ and the bolt replaced.

What we claim as our invention is—

1. In a bicycle, the combination of an adjustably-supported handle-bar stem, a clamp hinged to the stem and formed with a cap adapted to engage the end of said stem, a reversible and removable handle-bar journaled in said clamp and yieldable to a downward pressure, a spring supported in said stem, means on the handle-bar by which it bears on said spring to cushion said bar, a nut in said stem, and a bolt bearing with its head on said cap and engaging said nut for the purpose set forth.

2. In a bicycle, the combination of an adjustable handle-bar stem, a clamp hinged to said stem and having its free end portion formed into a cap, a removable and reversible handle-bar journaled in said clamp and yieldable to a downward pressure, a spring cushioning said bar and moving the same to its normal position, stops limiting the downward and upward movement thereof, a nut in said stem, and a bolt passing through the aforesaid cap and engaging said nut to draw said cap over the end of said stem to grip the handle-bar, as set forth.

3. In a bicycle, the combination of an adjustable handle-bar stem, a clamp hinged to said stem and provided with a vertical slot, a removable and reversible handle-bar journaled in said clamp and yieldable to a downward pressure, a disk secured within the said stem and formed with an eye, a spiral spring resting on said disk, a slot in said stem, a pin passing transversely through the handle-bar and with its outer end in the slot in said clamp, the inner end of said pin passing through the slot of said stem and having said end formed with a head provided with an elongated eye, said clamp having its free end formed into a cap over the end of the stem, said stem having its lower end beveled and provided with longitudinal slits, a conical nut within said end, and a bolt bearing with its head on the outside of said cap and passing through the aforesaid pin and disk and engaging said nut to tighten the clamp as set forth.

4. In a bicycle, the combination of a suitably-journaled steering-fork stem, a handle-bar stem in the said fork-stem, a support on said handle-bar stem and formed with two flanges, a clamp hinged to said support and provided with a slot, a handle-bar journaled in said clamp and bearing against said flanges and yieldable to a downward pressure, said clamp having its free end formed into a cap over the handle-bar stem, a disk secured within the said latter stem and provided with an eye, a spiral spring resting on said disk, a slot in the handle-bar stem, a pin passing transversely through said handle-bar and with its outer end in the slot in said clamp and its inner end passing through the slot in the handle-bar stem and having said latter end formed with a head provided with an elongated eye, said handle-bar stem having its lower end tapered internally and slit longitudinally, an externally-tapered nut in said lower end, a bolt engaging said tapered nut and having its head bearing on the exterior of the aforesaid clamp and passing through the aforesaid pin and disk to draw said nut upward and thereby expand the handle-bar stem to adjustably hold the same as set forth.

5. In a bicycle, the combination of a suitably-journaled steering-fork stem, an adjustable handle-bar stem therein, a clamp hinged to the latter stem, a reversible handle-bar journaled in said clamp and yieldable to a downward pressure, means to move said bar to its normal position, said handle-bar stem being tapered at its lower end and slit longitudinally thereat, an externally-tapered nut within said end, and a bolt drawing on said clamp to grip the handle-bar and engaging the aforesaid nut to expand the handle-bar stem against the aforesaid fork-stem to hold said handle-bar stem in its adjusted position as set forth.

In testimony whereof we have hereunto signed our names this 25th day of January, 1896.

LUCIEN BARNES, Sr. [L. S.]
CHARLES O. BARNES. [L. S.]

Witnesses:
J. J. LAASS,
M. A. LEYDEN.